United States Patent [19]

Toyama et al.

[11] Patent Number: 4,550,366
[45] Date of Patent: Oct. 29, 1985

[54] PROGRAMMABLE SEQUENCE CONTROLLER AND SYSTEM

[75] Inventors: Fumiyasu Toyama; Masaaki Murakoshi; Masanori Wakuda; Junichi Sasaki; Hirotoshi Watanabe; Tomio Yukawa; Yoshihiko Okayama, all of Shizuoka, Japan

[73] Assignee: Toshiba Kikai Kabushiki Kaisha, Tokyo, Japan

[21] Appl. No.: 407,542

[22] Filed: Aug. 12, 1982

[30] Foreign Application Priority Data

Oct. 17, 1981 [JP] Japan .................. 56-164941

[51] Int. Cl.⁴ .................................. G06F 15/46
[52] U.S. Cl. ......................... 364/136; 364/134; 364/138; 364/900
[58] Field of Search ............... 364/130, 131, 133, 134, 364/136, 138, 140, 141, 143, 200, 900

[56] References Cited

U.S. PATENT DOCUMENTS

| | | | |
|---|---|---|---|
| 4,029,950 | 6/1977 | Hago .................... | 364/136 |
| 4,123,794 | 10/1978 | Matsumoto ............ | 364/134 |
| 4,149,235 | 4/1979 | Froyd et al. .......... | 364/134 |
| 4,270,167 | 5/1981 | Koehler et al. ...... | 364/200 |
| 4,288,849 | 9/1981 | Yoshida et al. ...... | 364/474 |
| 4,325,120 | 4/1982 | Colley et al. ........ | 364/200 |
| 4,365,295 | 12/1982 | Katzman et al. ..... | 364/200 |
| 4,445,174 | 4/1984 | Fletcher .............. | 364/200 |

Primary Examiner—Jerry Smith
Assistant Examiner—John R. Lastova
Attorney, Agent, or Firm—Cushman, Darby and Cushman

[57] ABSTRACT

A programmable sequence controller and a sequence control system including a plurality of such controllers. Each sequence controller includes a program memory for storing a preprogrammed sequence of instructions for controlling a machine or part of a machine in response to the status of the machine or part being controlled. Each controller includes data transfer circuitry for receiving status data from another sequence controller on a common data bus and transmitting its own status data to all of the other sequence controllers on the common data bus. Each sequence controller includes an input-output (I/O) memory and an (I/O) flag memory for storing and keeping track of current status information from each of the plurality of controllers. Thus, each controller can make a control decision based not only on input and output status data from the specific machine or machine part that it controls but also based on the status of the machines or machine parts being controlled by the other sequence controllers linked by the common data bus. The number of sequence controllers linked by the common data line can be increased as necessary to execute increasingly complex control functions.

8 Claims, 23 Drawing Figures

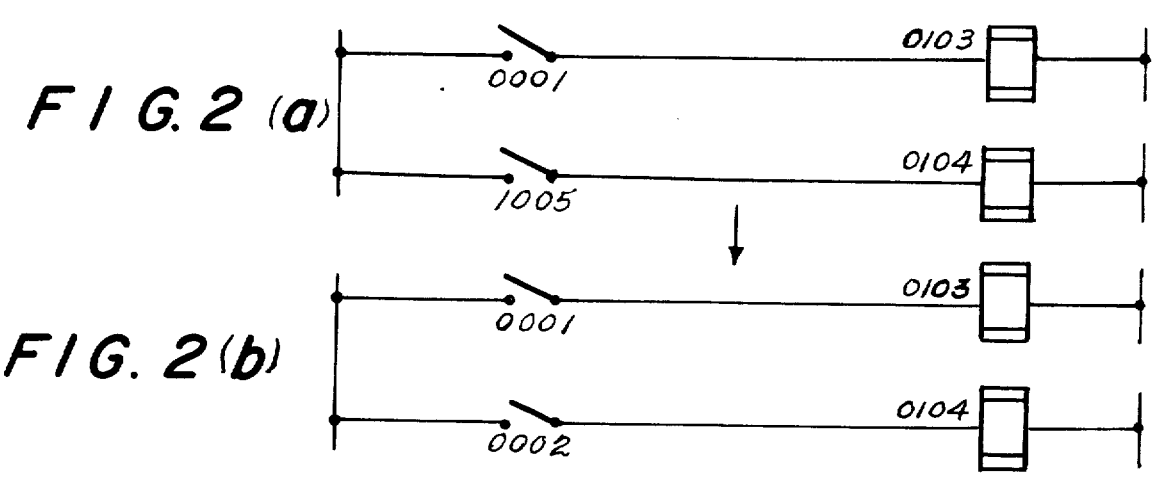
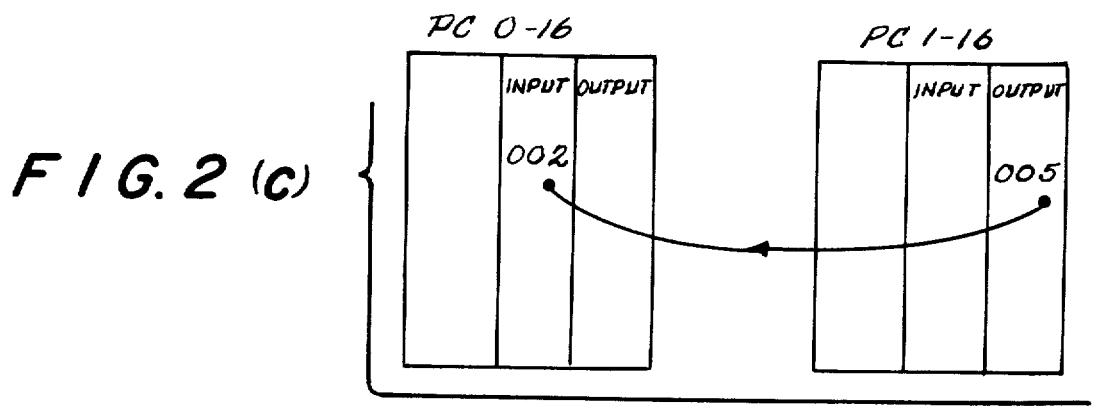
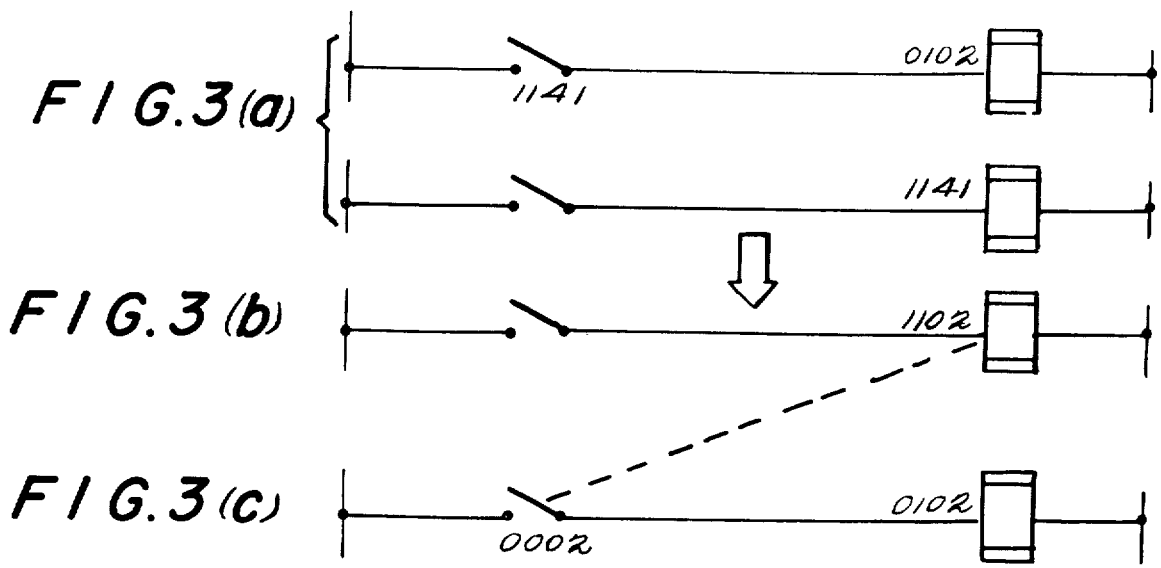

| M-AREA 0 | | M-AREA 7 | |
|---|---|---|---|
| NUMBER OF INPUT ELEMENTS FROM THIS PC. | 0000~0007 | | 7070~7077 |
| NUMBER OF OUTPUT ELEMENTS FROM THIS PC | 0100~0137 | | 7100~7137 |
| NUMBER OF INTERNAL RELAYS | 0140~0237 | | 7140~7237 |
| NUMBER OF SHIFT REGISTERS | 0240~0277 | | 7240~7277 |
| NUMBER OF TIMERS AND COUNTERS | 0300~0357 | | 7300~7357 |
| NUMBER OF STATUS | 0360~0377 | | 7360~7377 |

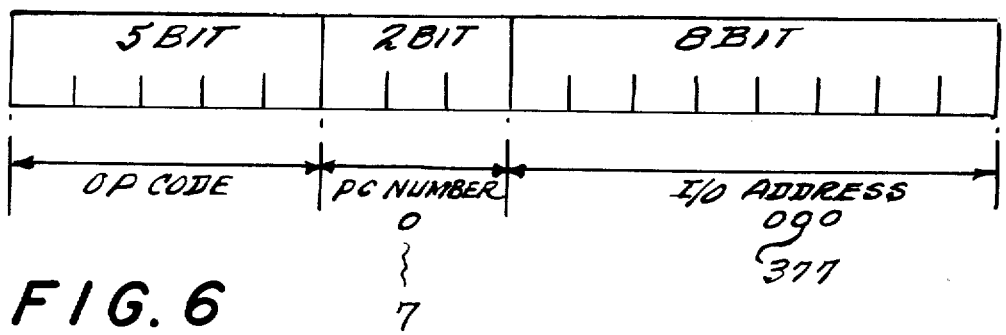
FIG. 6
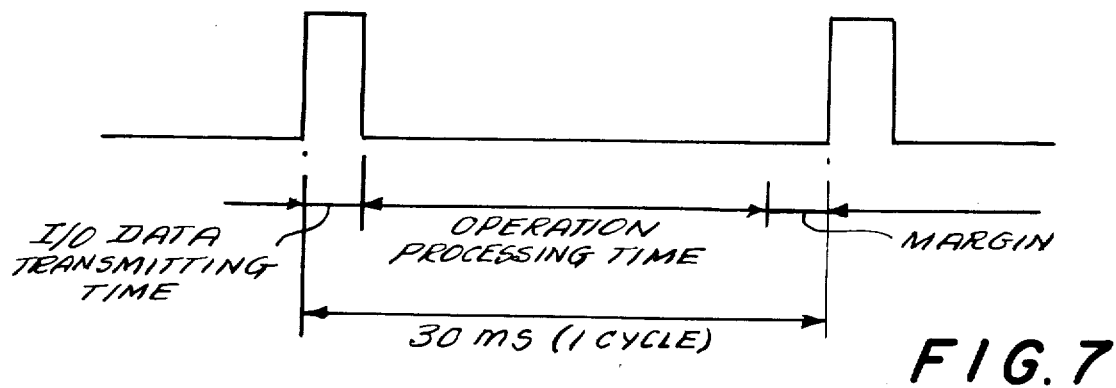
FIG. 7
FIG. 9

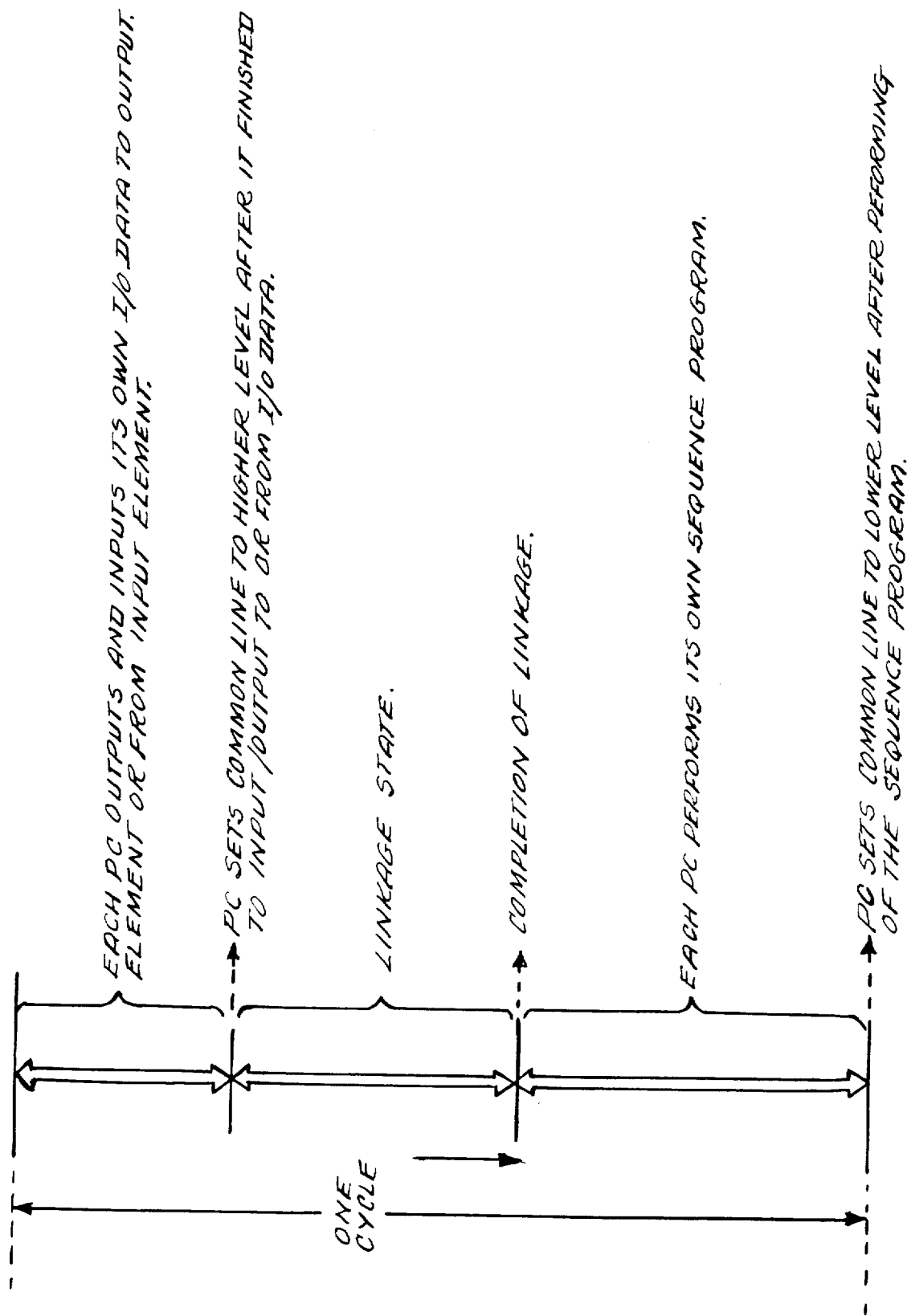

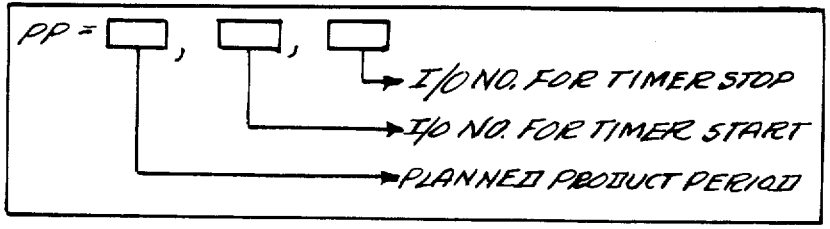
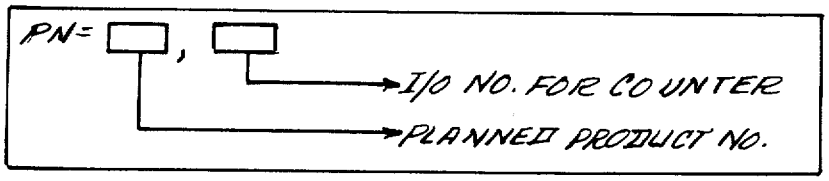
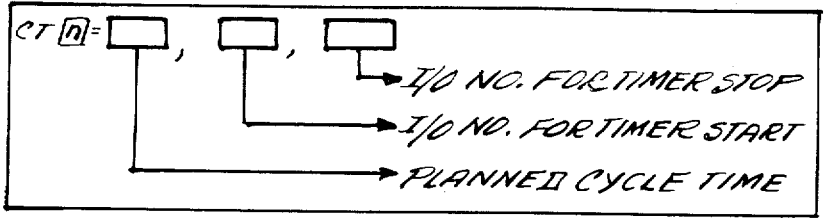
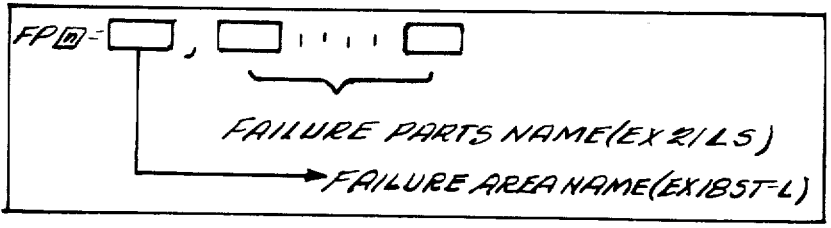
FIG. 12c

PROGRAMMABLE SEQUENCE CONTROLLER AND SYSTEM

BACKGROUND OF THE INVENTION

The invention relates to programmable sequence controllers (PCs) used to control machines. Typically, programmable sequence controllers are utilized to control manufacturing machines such as cutting or drilling machines operating to configure a workpiece to a desired size and shape. For example, it may be desirable to advance a drill toward a workpiece rapidly until the drill reaches a predetermined distance from the workpiece. Then, it may be desirable to begin rotating the drill and advance it slowly toward the workpiece to drill a hole to a predetermined depth. After the predetermined depth hole is drilled, it may be desirable to stop rotation of the drill and withdraw the drill rapidly in the opposite direction, after which the drilled workpiece is removed and a new workpiece substituted therefor. The sequence of control steps, i.e. advancing the non-rotating drill rapidly, rotating the drill and removing the drill rapidly, etc. are programmed sequence steps to be automatically carried out by the machine under control by a programmable sequence controller.

The specific control steps to be carried out by the machine are stored in a program memory unit of the PC. Periodically, the program memory unit is consulted to determine the current desired status of the machine under control. Actual status of the machine is determined from signals flowing to and from the machine under control. This status information is stored in a data memory unit. Based on the current desired machine status and the actual machine status, the sequence controller determines the appropriate output contol signal to send to the machine under control in order to obtain the desired status. In order to better appreciate the background of the present invention, FIGS. 1-3 illustrate a known programmable sequence controller and explain its functional and operational disadvantages.

Referring now to FIG. 1 (PRIOR ART), there is shown a block diagram of a known programmable sequence controller (PC). The PC is being utilized to control a machine MT in accordance with a sequence of control operations stored in a program memory unit 10 of the PC. Machine MT under control is shown in very simplified form as having a pushbutton switch, which when closed, provides an input signal MTIN to an input/output module unit 16 of the PC. The PC produces a control instruction constituting an output signal MTOUT flowing from input/output module unit 16 to a relay of machine MT for carrying out some operation. The PC further includes an interface unit 14 for interfacing data between input/output module unit 16 and an input/output data memory unit 12. Interface 14 is coupled to input/output data memory unit 12 via a bus 106 and to input/output module unit 16 via a bus 109.

As stated above, program memory unit 10 stores a sequence of instructions to be carried out in controlling machine MT. Input/output data memory unit 12 is used to store machine MT status data relating to the working state i.e. actual state of machine MT including the status of both the input MTIN from machine MT to the PC and the output MTOUT from the PC to machine MT. Controller PC further includes an arithmetic calculating unit 18 coupled to program memory unit 10 via a bus 102 and coupled to input/output data memory unit 12 via a bus 103. Arithmetic calculating unit 18 receives instructions from program memory unit 10 via bus 102 and current machine status data via bus 103 from input/output data memory unit 12. It includes counters, registers, timers and/or other devices required for carrying out the required calculations and data manipulations for determining the appropriate output control signal for controlling machine MT. A control unit 20 supplies command signals to the other units of the PC and receives signals from the control signal lines 101, 104, 105, 107 and 108. Even though these are shown only as single lines in FIG. 1, they may include multiple lines for carrying multiple control signals simultaneously. For example, signal line 108 may be used to supply a timing signal and address signals for commanding input/output module units 16 to transmit or receive signals between machine MT and input/output module units 16. Signal line 101 may be used to supply program memory unit 10 with an address assignment signal. In a PC having a calculating capability, arithmetic calculating unit 18 and control unit 20 can together form a control unit CU.

When a PC such as described above with respect to FIG. 1 is used to control a machine MT, various operational difficulties exist, particularly, when the PC has a small capacity, such as for example, a data capacity of 128 or less and a memory capacity of 1K or less. Some of these problems are as follows:

(a) When a small capacity PC is used to control a machine MT and the desired control functions are changed, it is often necessary to replace the small size PC with a medium or large size PC having increased data capacity such as for example an increased data capacity from 128 to 512 and an increased memory capacity from 1K to 4K.

(b) A small PC is inferior to a large PC in various respects such as programmability, diagnostic ability and the lack of ability to functionally upgrade to more complex control functions.

(c) The function of a small PC is different from that of a large PC. The same operating properties cannot be obtained with a small PC as could be obtained with a larger one.

(d) When a plurality of small PCs are coupled in parallel in an effort to carry out more complex control functions than could be executed by a single PC, the linkage among them must be carried out via their respective input/output modules.

(e) When a plurality of small PCs are used in parallel, loading or sequence programming must be performed individually in each PC.

(f) A small PC is inferior to a large PC in operating processing speed.

The operational difficulties, particularly those set forth in paragraph (d), above, associated with the known PC as shown in FIG. 1 are discussed more specifically with respect to FIGS. 2 and 3 below.

Referring now to FIG. 2 there is shown in diagrammatic form the manner in which two known PCs can be hardwire coupled to carry out a machine control. It is assumed in this example that two known PCs (PC0 and PC1) of the type shown in FIG. 1 are coupled together with the intended purpose that the output of controller PC1 forms an input condition for controller PC0. In other words, it is desired that controller PC0 perform at least one control function based at least in part on the status of the machine controlled by controller PC1.

FIG. 2(a) shows a ladder circuit for this arrangement. In FIG. 2(a), there is a contact switch in the upper left corner marked 0001. The first "0" of the three zeros indicates that this contact switch is associated with controller PC0. Similarly, there is shown a relay in the upper right corner marked 0103. The first "0" indicates that the relay responds to an output of controller PC0 i.e. it is associated with controller PC0. Similarly, in the lower portion of FIG. 2(a), a contact switch 1005 forms an input to PC1 and a relay 0104 is actuated by controller PC0. In order to execute the desired control as illustrated by the FIG. 2(a) ladder, it is necessary that an internal contact 0002 be installed within controller PC0 in place of contact 1005. This is illustrated in FIG. 2(b).

Referring now to FIGS. 2(b) and 2(c), there is shown a ladder network illustrating the replacement of the contact switch 1005 shown in FIG. 2(a) by a contact switch 0002. The first "0" in this number indicates that switch 0002 is associated with controller PC0. Switch 0002 is connected to output 005 of PC1, as shown in FIG. 2(c), by hardwiring between the I/O module units of PC0 and PC1.

When a plurality of PCs are cooperatively operated, the hardwire connections among the PCs complicates the circuit construction as the number of controllers increases. Particularly, when wiring changes are required at a program memory unit of a PC as a result of a change of sequence working specification in its associated machine MT, the advantageous use of the known PC is reduced significantly. This normally requires the substitution of a medium or large size PC for the originally utilized smaller one.

Referring now to FIG. 3, there is shown a ladder diagram explaining further the difficulties that exist when two known PCs such as PC0 and PC1 are operated cooperatively as in FIG. 2. In the upper left corner of FIG. 3, contact switch 1141 serves as an input to PC1. Relay coil 1141 is actuated by PC1 and relay 0102 is actuated by PC0. In this case, contact switch 1141 associated with PC1 is used as an input condition for relay 0102 associated with PC0. It is desired to associate relay 1102, shown in FIG. 3(b), with contact switch 0002 shown in FIG. 3(c). It is therefore necessary to connect the I/O module units of PC0 and PC1 by hardwiring them to achieve this response condition.

SUMMARY OF THE INVENTION

To overcome these operational disadvantages of the known PCs, particularly when the multiple PCs must be employed to carry out more complex response functions than could be carried out using a single PC, it is an object of the present invention to provide a programmable sequence controller of small scale, the functions of which can be upgraded by utilizing a plurality of them operatively connected.

To this end, the present invention provides a novel programmable sequence controller having the capability of communicating with a plurality of similar PCs along a common data bus. Each PC can execute a control of its associated machine based not just on the status of its associated machine, but based also on the status of machines associated with the other PCs on the common data bus. Complex control functions can be carried out without the need to hardwire among the PCs. This is accomplished by including within the programmable sequence controller a data transfer unit for placing machine status data onto or receiving status data from the common data bus linking the PCs. Each PC includes an I/O memory and an I/O flag memory for temporarily memorizing the status conditions of each of the other PCs with which it cooperates.

More specifically, the invention provides a programmable sequence controller comprising an I/O data control unit connected to I/O elements for sending control signals or receiving input from a machine being controlled, an I/O data memory unit for storing I/O data, a program memory unit for storing a sequence program to be executed, an arithmetic calculating unit for performing calculations based on the sequence program read from the program memory unit, a control unit for supplying the above-mentioned units with appropriate control signals, an I/O flag memory unit for writing and storing I/O flat information at a position corresponding to an address of the I/O data outputted in accordance with the sequence program in any of a plurality of controllers operated in combination, and an I/O data transfer unit for reading and writing input/output data and input/output flag data for the I/O data memory unit and I/O flag memory unit when the unit is linked with others during a sequence cycle.

It is preferred that the I/O data memory unit and I/O flag memory unit have corresponding memory areas in each of the plurality of PCs operating in conjunction with one another.

It is also preferred that the I/O data transfer unit be provided with a decimal counter and an address counter, a writing pulse being supplied from the decimal counter to the I/O data memory unit and an adding pulse being supplied to the address counter and address command being supplied from the address counter to the I/O data memory unit and the I/O flag memory unit.

BRIEF DESCRIPTION OF THE DRAWINGS

FIGS. 2(a), (b), (c) are diagrams illustrating disadvantages of the conventional PC shown in FIG. 1;

FIGS. 3(a), (b), (c) are diagrams illustrating disadvantages of the conventional PC shown in FIG. 1;

FIG. 6 is a diagram illustrating the format of a sequence program instruction word;

FIG. 7 is a time chart showing a process variation in one sequence;

FIG. 8(a) is circuit diagram, FIG. 8(c) is a diagram illustrating a linkage state in one sequence cycle;

FIG. 9 is a map of the I/O data memory unit and I/O flag memory unit of a PC according to the present invention;

FIG. 12(a) is a circuit diagram, FIG. 12(c) is a diagram showing items for list implementation using teletype (TTY)

DETAILED DESCRIPTION OF THE PREFERRED EMBODIMENT

Figure 1:
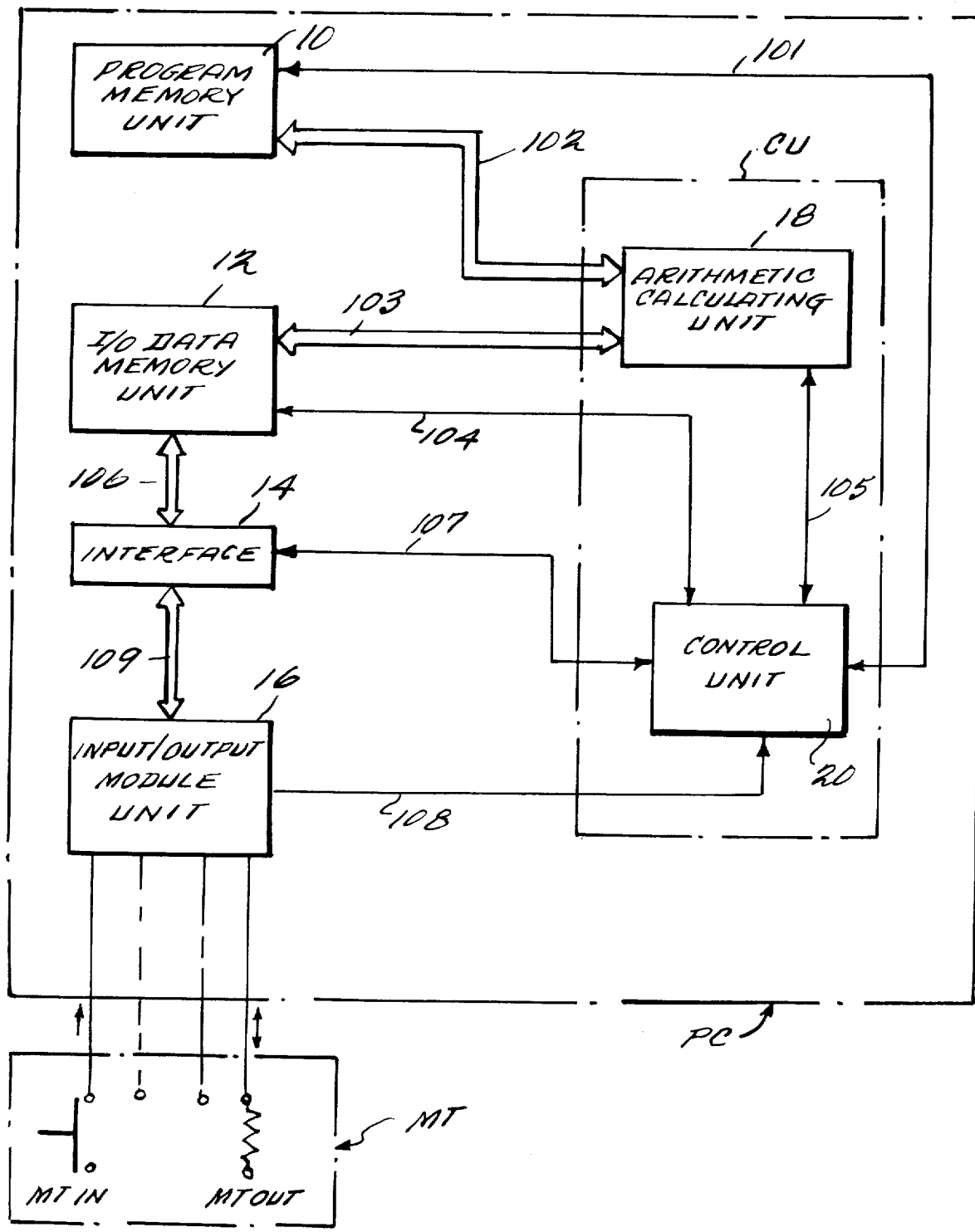
FIG. 1 (PRIOR ART) is a block diagram of a conventional programmable sequence controller (PC)
Figure 4:
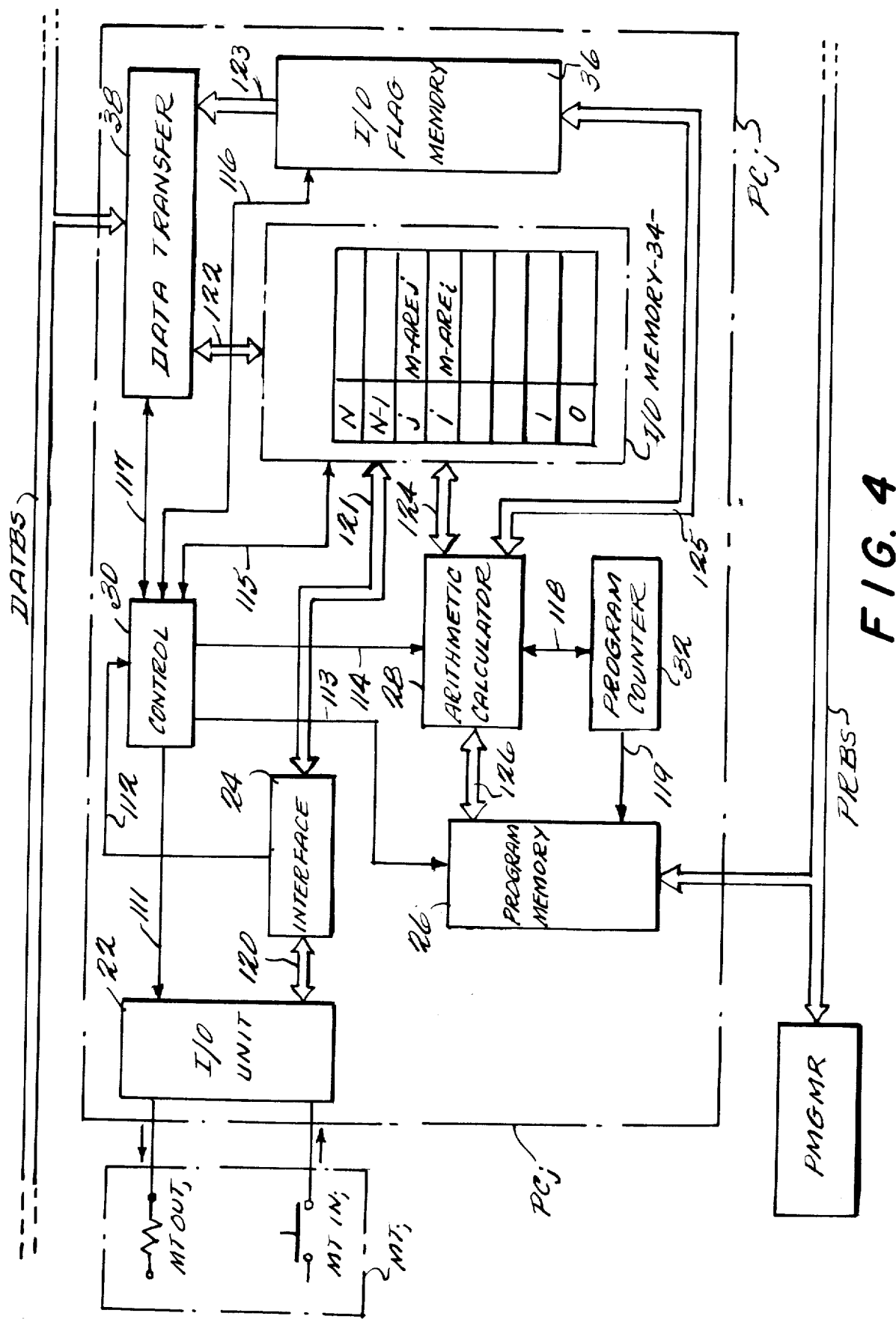
FIG. 4 is a block diagram of a programmable sequence controller (PC) according to the invention.

Referring now to FIG. 4, there is shown a block diagram illustrating a preferred embodiment of a programmable sequence controller ($PC_j$) according to the invention with its associated machine or machine part $MT_j$. A programmable sequence controller $PC_j$ and its associated machine or machine part $MT_j$ bear the same subscript j (j=0, 1, 2, 3, ... 7). Up to eight (8) PCs in this presently preferred exemplary embodiment can be cooperatively operated to achieve a complex control function over the machines or machine parts associated therewith. Of course with increased data storage capacity, more than eight (8) PCs could be coupled. By adding additional PCs, the system can be upgraded. Connection to machine device $MT_j$ is made via an input element $MTIN_j$ and an output element $MTOUT_j$. MTOUT is represented by a switch, the closing of which by a machine action sends data to $PC_j$. MTIN is represented by a relay coil that can be actuated by a signal from $PC_j$.

The functional blocks of $PC_j$ include: an input/output (I/O) unit 22, an interface unit 24, a program memory unit 26, an arithmetic calculating unit 28, a control unit 30, a program counter 32, an I/O data memory unit 34, an I/O flag memory unit 36 and a data transfer unit 38.

I/O unit 22 is connected to input element $MTIN_j$ and output element $MTOUT_j$ of machine $MT_j$ being controlled. Interface unit 24 buffers I/O data between I/O unit 22 and I/O data memory unit 34. Program memory unit 26 stores a sequence program of instructions defining the desired control over machine $MT_j$. Arithmetic calculating unit 28 receives program instructions from program memory unit 26 via a bus 126 and carries out the calculations necessary for determining the control signals to be generated for controlling machine $MT_j$. Control unit 30 transmits or receives control signals to or from the other functional blocks 22, 24, 26, 28, 34, 36 and 38, respectively via control signal lines 111, 112, 113, 114, 115, 116 and 117. Program counter 32 receives commands via a signal line 118 when the processing of a command unit by arithmetic calculating unit 28 is completed. Program counter 32 also assigns addresses to program memory unit 26 through an address line 119, for identifying subsequent instructions.

I/O data memory unit 34 is provided with a memory area M.ARE, divided into sections of O - N (N=7 in this exemplary embodiment) corresponding to the number of PCs that are cooperatively coupled to one another. Each memory area stores data representing a logical state of an input element $MTIN_j$ and an output element $MTOUT_j$ of a machine device $MT_j$ controlled by a $PC_j$. In other words, section #1 of the memory area, $M.ARE_1$ stores the input and output logical states $MTIN_1$ and $MTOUT_1$ of machine $MT_1$. Section #2 of the memory area $M.ARE_2$ stores the input and output logical states $MTIN_2$ and $MTOUT_2$ of machine $MT_2$. When a plurality of PCs are linked by a common data bus DATBS, the contents of the I/O memory 34 of each $PC_j$ will be the same. Thus, each PC knows the status of every machine MT. Data to and from the I/O memory 34 of each PC communicates with common data bus DATBS the associated data transfer unit 38 of each $PC_j$.

I/O flag memory unit 36 is a memory in which a flag i.e. logical value "1" is written at a position corresponding to an address of the input/output elements ($MTIN_j$, $MTOUT_j$) of any $PC_j$ (j=0–7). A flag is stored to mark a prescribed address in concurrence with the implementation of a sequence program. Since a flag is written corresponding to an address of the input/output elements ($MTIN_j$, $MTOUT_j$) of any $PC_j$ (j=0–7) as above described, the content of I/O data memory units 34 of all PCs is the same in a linkage state of all PCs under hereinafter described action of data transfer unit 38.

Since each PC knows the status of inputs and outputs of all PCs on the common data bus, each PC can make control decisions based on any combination of inputs and outputs of the machines linked to each of the PCs. For example, the $PC_3$, instead of generating a control signal based only on the program instructions stores in its program memory 26, on the status of $MTIN_3$ and $MTOUT_3$, it can base a control signal also on the status of $MTIN_2$, $MTOUT_2$ and on the status of $MTIN_6$ and $MTOUT_6$. Thus, the system function can be significantly upgraded so that complex control functions can be carried out without the need to hardwire from one PC to another.

There are provided data buses 120, 121, 122, 123, 124 and 125 for carrying program instructions and MTIN; MTOUT; status data as required among the various functional blocks of PC.

The program memory unit 26 of each PC is coupled via a program bus PRBS to a programmer PRGMR. Programmer PRGMR supplies the program sequence instructions defining the desired control for each PC.

Figures 5A, 5B:
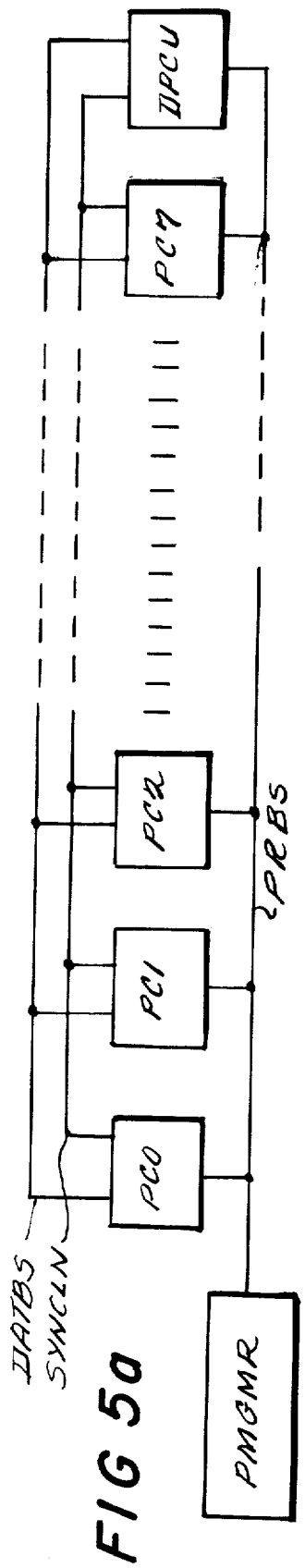
FIGS. 5(a), (b), (c) are diagrams illustrating the relationship among connections of eight (8) PCs and the addresses in the memory area of an I/O data memory unit.

Referring now to FIG. 5(a), there is shown a block diagram illustrating the system connection of eight PCs ($PC_0$-$PC_7$) with programmer PRGMR and a Diagnosis & Production Control Unit DPCU, not shown in the previous figures.

FIG. 5(b) is a table indicating a typical set of address assignments within a data memory unti 34 associated with $PC_j$. Each address includes four (4) digits, the most significant digit (left end) coincides with the number of the PC with which it is associated i.e. the PC supplying data stored at that address. Note the dotted line around the first digit of 0000 in the first row of the $M.ARE_0$ column and around the first digit "7" in the first row of the $M.ARE_7$ column.

I/O data comprises data specifying the number of input elements for the PC, output elements for the PC, internal relays of the PC, shift registers for the PC, timers and counters for the PC, and statuses for the PC. Each data of course corresponds to the PC defined by the column in which the address occurs. The shift registers, timers and counters are used for producing signals related to the execution of sequence program steps, such as, for example, by arithmetic calculation carried out by arithmetic unit 28 shown in FIG. 4. The values or contents or logical states of the shift registers, timers and counters are stored in memory 34 and are treated as if they were input or output elements.

Figure 5C:
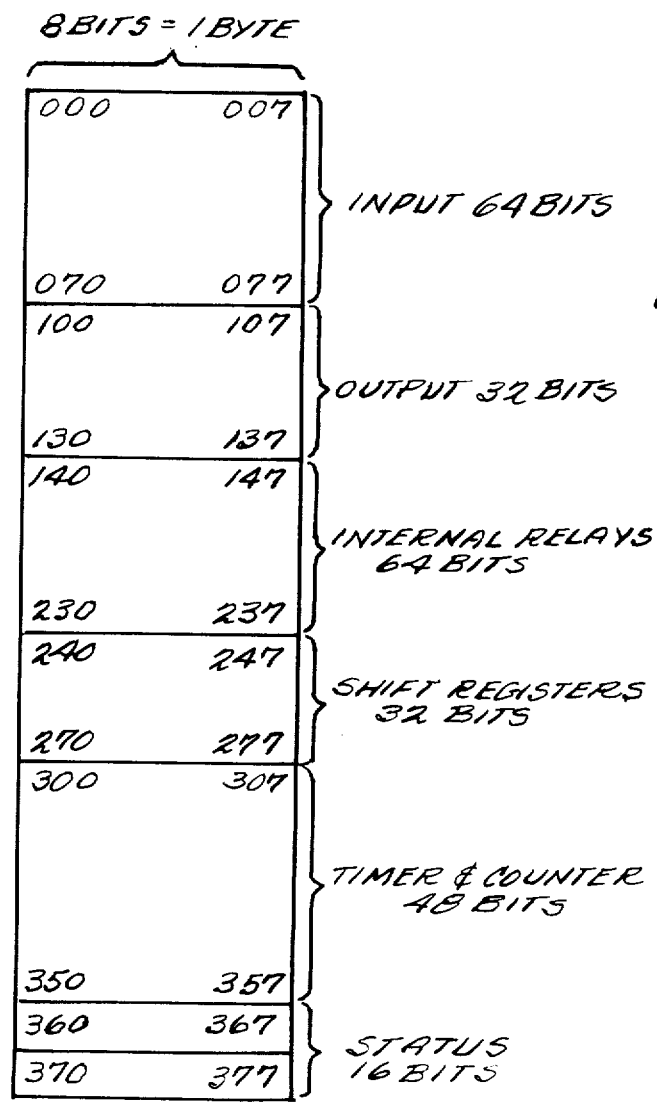

FIG. 5(c) is a more detailed memory map illustrating the relationships among the various addresses. The first digit of each address, designating the PC supplying the data, is eliminated. Data of 256 bits (32 bytes) in octal notation corresponds to memory capacity in one memory area. I/O data memory 34 includes memory areas for each of the eight (8) PCs. Each memory area of each PC is formatted as shown in FIG. 5(c).

Referring now to FIG. 6, there is shown an instruction pattern for transfer of data among PCs on the common data bus. Each pattern includes a five bits operation code (OP code), a three bits code for indicating the PC number (j=0-7) and and eight bits code for indicating the I/O address. This arrangement permits any PC to use I/O data of any of the PCs.

Referring now to FIG. 7, there is shown a time chart illustrating the relationship between data transmitting time and operation time in one sequence cycle of the system of plural PCs. In general, data transmission is performed sequentially from $PC_0$ to $PC_7$. After I/O data of each PC is transmitted to all PCs, operation is executed by each PC of the system using the I/O data then stored in their respective I/O data memories 34. Since operation time depends on the content of the processing program, margin is provided so that operation time for each PC does not exceed 30 msec. Consequently, I/O data transmission and operation are repeated alternately in 30 msec. time units. In other words, each PC takes up to 30 msec. to transfer data with common data bus DATBS and 30 msec. to operate during each sequence cycle.

Figure 8A:
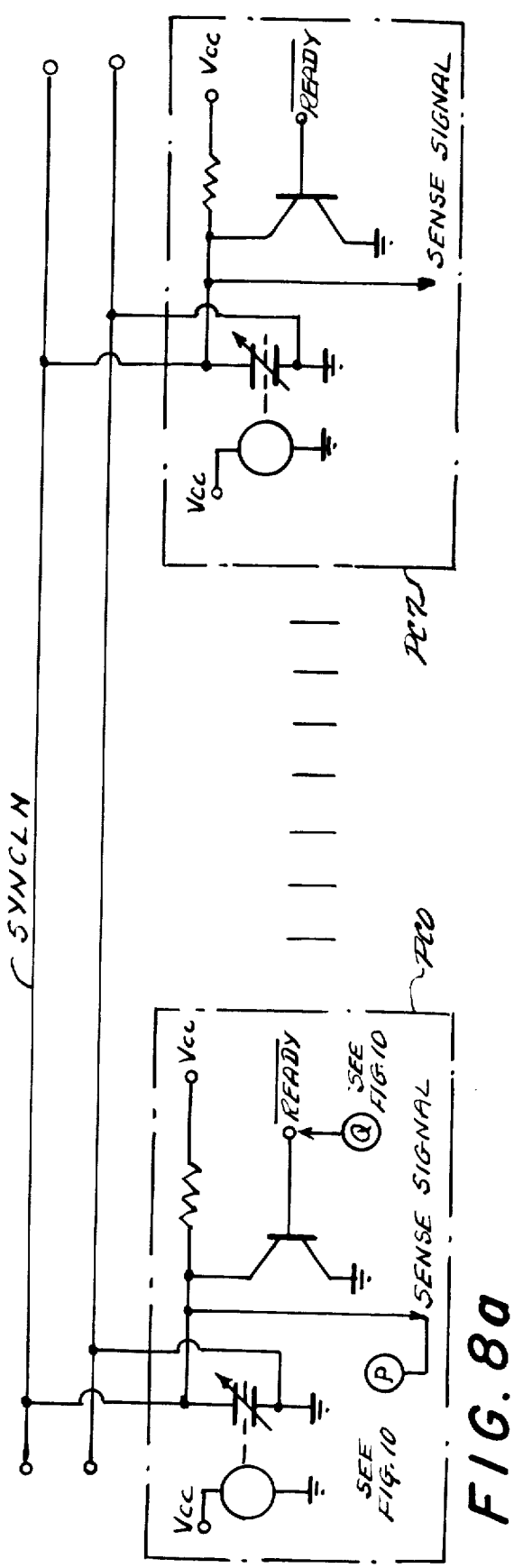
FIGS. 8(a), (b), (c) are diagrams relation to the synchronization of all PCs. More specifically.

Referring now to FIG. 8(a), there is illustrated a scheme by which synchronism is established among the eight (8) PCs operating in the system. When a PC comes to a condition for responding to the next sequence cycle, signal $\overline{READY}$ becomes $\overline{READY}=0$. As can be seen from FIG. 8(a), if condition $\overline{READY}=0$ is not provided in all PCs, a synchronous line SYNCLN coupling all of the PCs does not become "high". In other words, when condition $\overline{READY}=0$ is given in the signal $\overline{READY}$ of the latest timing, synchronization is established. If synchronization is obtained in such manner, each PC is supplied with a SENSE SIGNAL.

Figure 8B:
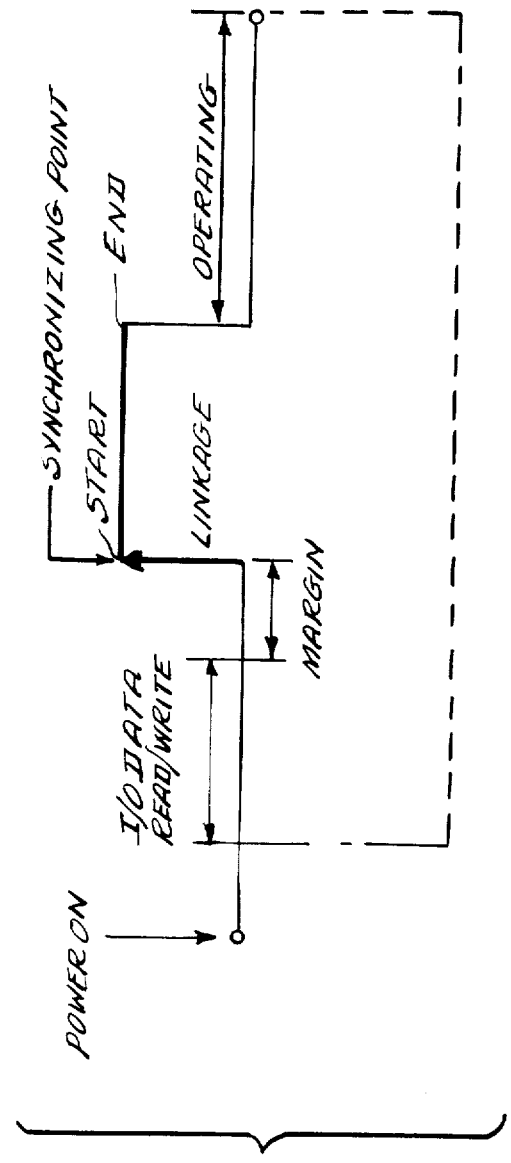
FIG. 8(b) is a diagram of a logical state of a synchronous line.

Referring now to FIG. 8(b), there is shown a time chart illustrating the relationship between synchronous line SYNCLN and each process in the sequence of one cycle. The sequence cycle begins after power source is turned on. First, each $PC_j$ receives or outputs data from or to the corresponding input/output elements $MTIN_j$, $MTOUT_j$, of its machine $MT_j$ through its I/O unit 22 and interface unit 24 to or from its memory area M.A-$RE_j$ in its data memory unit 36. This is referred to as READ/WRITE. After the margin time passes, if signal $\overline{READY}=0$ is provided by every $PC_j$ (j=0-7) as shown in FIG. 8(a), synchronization is established. Linkage among all PCs is established and transmission of I/O data among the PCs is performed sequentially from linkage START. When process comes to linkage END, each $PC_j$ executes an operation based on its own program sequence. After completion of the operation, process of READ/WRITE of I/O data is again executed as shown in broken line. FIG. 8(c) specifically illustrates the process of one sequence cycle as above described.

Referring now to FIG. 9, there is shown a format comparing each memory area in I/O data memory unit 34 and I/O flag memory unit 36. I/O data memory unit 34 and I/O flag memory unit 36 have the same dimensions, and I/O flag memory unit 36 sets a flag in a position corresponding to the output number outputted in each $PC_j$ regardless of its logical operation.

Figure 10:
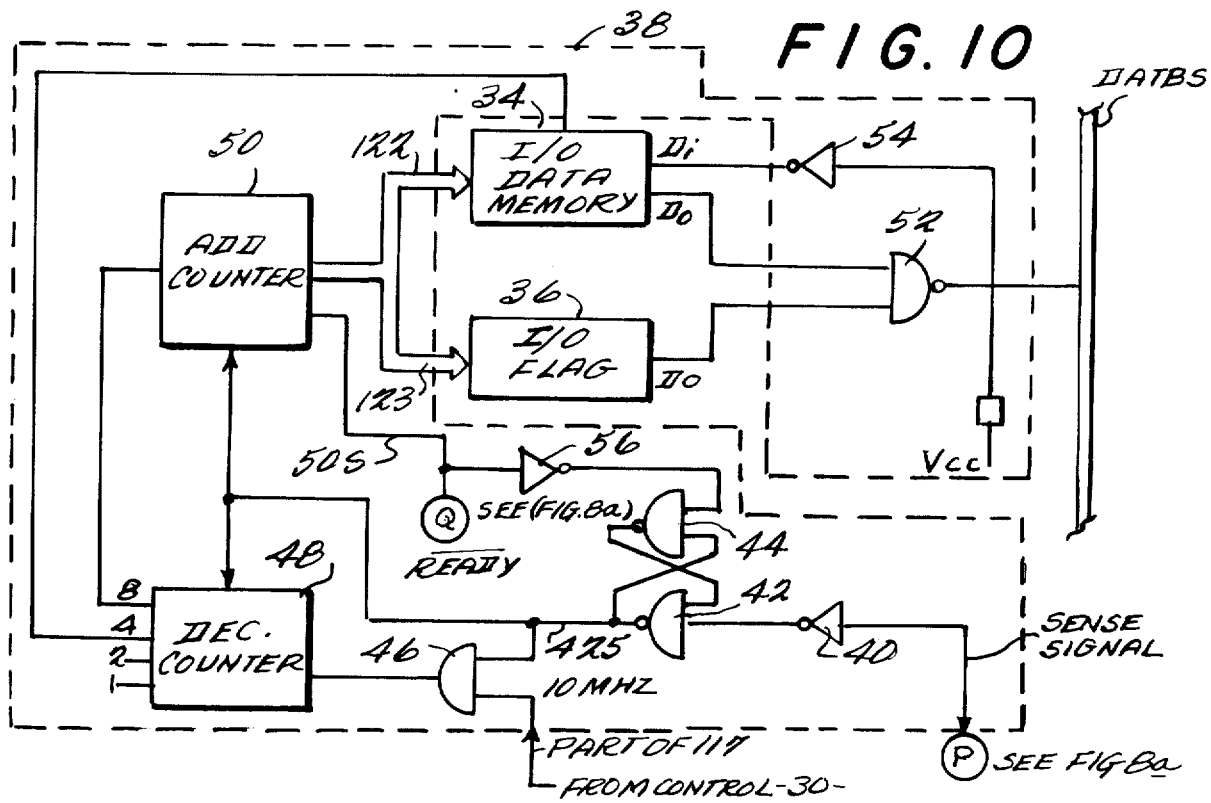
FIG. 10 is a circuit diagram of a specific example of a data transfer unit.

Referring now to FIG. 10, there is shown a detailed circuit diagram of the I/O data transfer unit 38 shown in FIG. 4. The SENSE SIGNAL of $PC_j$ described in FIG. 8(a) is supplied through an inverter 40 to an RS flip-flop comprising NAND gates 42 and 44. When ready state for linkage is completed in every $PC_j$(j=0-7) and signal $\overline{READY}$ becomes "0", SENSE SIGNAL becomes "1" thereby setting the RS flipflop and making a set signal 42S at the output of the flipflop become a logical value "1". Based on the output of the RS flip-flop (logical value "1"), a clock signal of 10 MHz from control unit 30 is supplied to a decimal counter 48 through AND gate 46. An output of decimal counter 48 is supplied to an address counter 50. Address counter 50 and I/O data memory unit 34 and I/O flag memory unit 36 are connected commonly via a suitable address line. Address counter 50 and decimal counter 48 are cleared during reset state of RS flipflop (42, 44).

Since address counter 50 is cleared at first, its address value becomes "0" and an output of address "0" is obtained at output $D_o$ of I/O data memory unit 34 and I/O flag memory unit 36. Output $D_o$ in these units 34, 36 is connected through an open collector NAND gate 52 to an I/O data bus DATBS. Signals from the I/O data bus DATBS are transmitted to memory unit 34 through an inverter 54 as signals Di for writing data into I/O memory unit 34.

In this circuit arrangement, when decimal counter 48 counts to "4", a writing pulse to the I/O data memory unit becomes "high". Subsequently, when decimal counter 48 counts to "8", the writing pulse becomes "low". At the falling edge of the writing pulse the contents of the I/O data bus DATBS are written into I/O data memory unit 34. When decimal counter 48 counts to "8", the adding pulse to address counter 50 becomes "high", and subsequently when decimal counter 48 counts to "0", the adding pulse becomes "low" and at the falling edge of the adding pulse, address counter 50 is incremented by "1" and adds the next address to the above mentioned memory units 34 and 36. By repeating this operation, memory data of 2048 bits with memory address 0000-2047 is supplied to I/O data bus DATBS.

Figure 11:
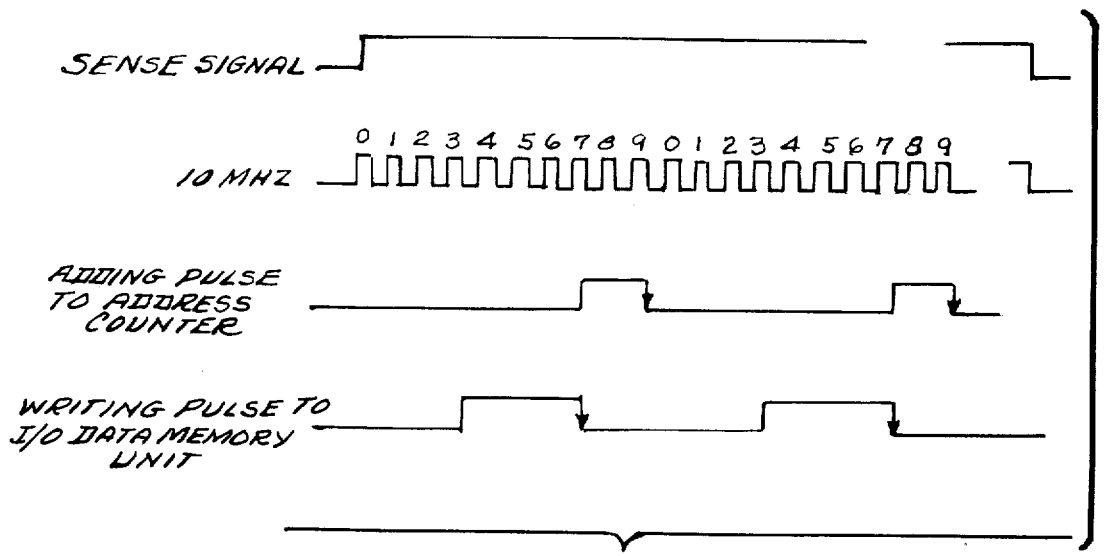
FIG. 11 is a wave-form chart illustrating a working state of the circuit shown in FIGS. 10.

Referring now to FIG. 11, there is shown a time chart illustrating the operation of the FIG. 10 embodiment I/O data transfer 38. $PC_j$ (j=0-7) is connected to the I/O data bus DATBS in wired OR connection. Accordingly, when address counter 50 counts to address 2048, output signal 50S becomes "high" and the $\overline{READY}$ signal becomes "0". RS flipflops 42, 44 are reset through an inverter 56 (shown in FIG. 10). In response to the resetting of RS flipflops 42, 44, address counter 50 and decimal counter 48 are cleared. When linkage of each $PC_j$ (j=0-7) is completed in this manner, the contents of I/O data memory unit 34 of all $PC_j$ (j=0-7) becomes the same. Not only can the input signals entered in any $PC_j$ be used in its respective $PC_j$, but also the outputs programmed at any $PC_j$ can be transferred to all other $PC_j$ which in turn can process based on this information.

Figure 12D:
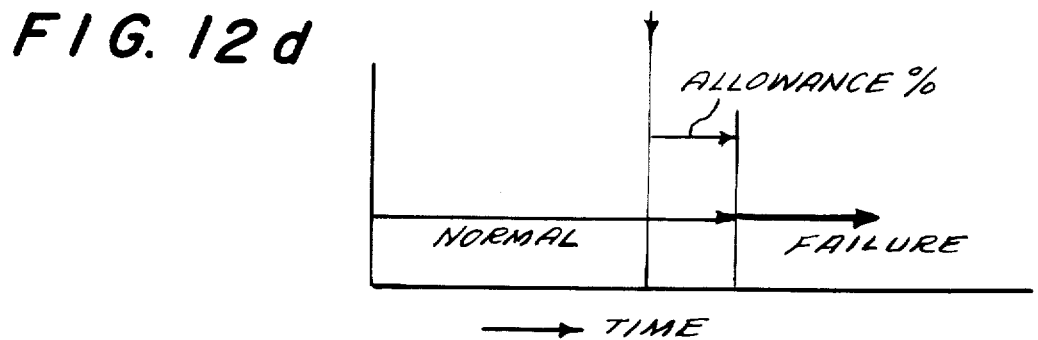
FIG. 12(d) is a diagram illustrating the relationships among normal state, failure and allowance.
Figures 12A, 12B:
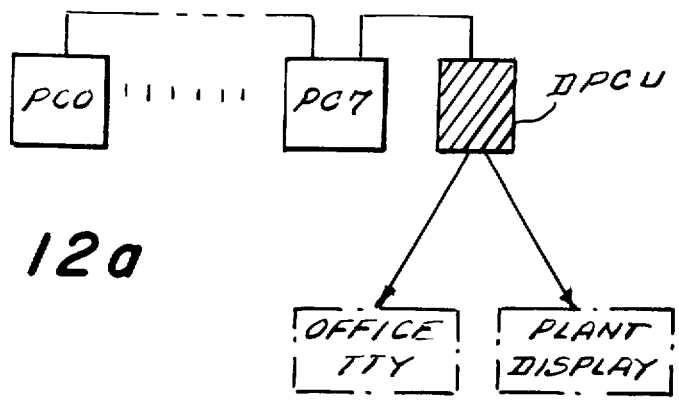
FIGS. 12(a), (b), (c), (d) are diagrams relating to diagnosis unit (DPCU) shown in FIG. 5(a). More specifically.
FIG. 12(b) is an example of production data types of teletype (TTY)

Referring now to FIG. 12(a), there is shown a diagram illustrating the connection of diagnosis unit DPCU, also shown in FIG. 5(a). Diagnosis unit DPCU can provide diagnosis information by a teletype TTY in an office or by appropriate indication on a display device DISPLAY near the machine or machines being controlled. The teletype can prepare a list of production data and the display device DISPLAY can indicate a down state of machine MT and indicate a failure.

FIG. 12(b) shows example of production data that can be prepared by teletype TTY. Such data can be typed at any time or only upon a failure or at closing time of the plant in which machine MT is operating.

FIG. 12(c) shows items of necessary data for list implementation using the teletype TTY (relationship between each I/O element and time is mainly interested in this example) when data is taken from the teletype. FIG. 12(d) shows planned cycle time in each I/O element and allowance, and value beyond the allowance is compared with failure.

Although loading of a sequence program to a programmable memory unit for each PC$_j$ (j=0-7] is performed using a programmer and program bus in the above mentioned embodiments according to the present invention, program memory may be previously implemented in other manners without using a programmer and program bus. For example, the program could be defined by firmware in an integrated circuit memory which could be "plugged-in" to controller PC$_j$.

As above described, according to the present invention, each programmable sequence controller PC is provided with an I/O data memory unit and an I/O flag memory unit with memory area of I/O data and I/O flag corresponding to input/output elements for other programmable sequence controller, and an I/O data transfer unit is installed to write I/O data and I/O flag in memory area for other sequence controller in linkage state during sequence cycle, thereby all controllers as one unit can increase the number of I/O data to be processed and function of each controller can be upgraded. Consequently, such programmable sequence controllers are driven in parallel connection, each controller can make control decisions based on information relating to input/output elements for other controller as if it were information from input/output elements for its own controller, thereby connection between I/O module units using hard wire as shown in FIGS. 2 and 3 can be obviated.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What is claimed is:

1. In a programmable sequence controller (PC) for controlling a machine, including means for receiving status data from said machine, a program memory for storing a set of program instructions for controlling the machine, and means for generating a control signal for controlling the machine responsive to the program instructions set and said machine status data, and where said PC may be linked via a common data bus to other PCs which control other machines, the improvement comprising:

data transfer means for transmitting said machine status data to said common data bus, and for receiving from said common data bus, the status bus of the machines associated with said PCs; and
input/output (I/O) status memory means for storing said machine status data and said other status data, thereby providing said PC with the ability to generate a control signal that can be responsive to said other data, said I/O status memory means including an I/O memory for storing said machine and said other status data, and a flag memory for marking an address of said I/O memory to indicate the presence or absence of a communication occurring between any of said PCs and its associated machines.

2. A programmable sequence controller (PC) for controlling a machine, comprising:

means for receiving status data about said machine;
means for transmitting a control signal to said machine for controlling said machine;
a program memory for storing a preprogrammed sequence of instructions specifying a desired control of said machine;
data transfer means for transmitting said machine status data to a data bus, and for receiving from said data bus the status data of other machines associated with other PCs which are linked to said data bus;
input/output (I/O) status memory means for storing said machine status data from said receiving means and said other status data from said data transfer means, said I/O status memory means including an I/O memory for storing said machine and said other status data and a flag memory for storing a marker for flagging an address of I/O memory; and
means for (a) reading said sequence instructions from said program memory and said machine and said other status data from said I/O memory means and (b) generating said control signal for transmission to said machine.

3. A system of programmable sequence controllers (PCs) for controlling a plurality of machine parts, respectively, comprising:

a common data bus line for carrying status data related to each one of said plurality of machine parts to all of said PCs on said data bus, each one of said PCs comprising:
means for receiving said status data from the machine part associated with said one PC;
means for transmitting a control signal to said machine part for controlling said machine part;
a program memory for storing a preprogrammed sequence of instructions specifying a desired control of said machine part;
data transfer means for transmitting status data to and receiving status data from said data bus;
input/output (I/O) memory means for storing status data from said receiving means and said data transfer means, said I/O memory means including an I/O status memory for storing status data and a flag memory for storing a marker for flagging an address of I/O memory; and
means for (a) reading said sequence instructions from said program memory and status data from said I/O memory means and (b) generating said control signal for transmission to said machine part for controlling said machine part.

4. A programmable sequence controller (PC) which may be linked to other PCs via a common data bus, comprising:

I/O data control means, adapted for coupling to input/output elements of a controlled object, for transmitting/receiving I/O data;
I/O data memory means coupled to said I/O data control means for storing said I/O data;
program memory means for storing a sequence program which controls said controlled object;
calculating means, connected to said program memory means, for effecting arithmetic calculations in accordance with said sequence program;

control means for applying control signals to said I/O data control means, I/O data memory means, program memory means and calculating means;

I/O data transfer means connected to said I/O data memory means and said common data bus for transferring said I/O data to any other PC on said common data bus and receiving from any other PC I/O data which that PC transfers to/from its associated controlled object;

I/O flag memory means, coupled to said I/O data transfer means and said I/O data memory means and said calculating means, for storing I/O flags in specific memory locations corresponding to the identities of said other PCs connected to said common data bus, each of said flags indicating that a particular one of said other PCs is transferring I/O data to/from its associated controlled object.

5. A programmable sequence controller as in claim 4, wherein said I/O data memory means and said I/O flag memory means have corresponding memory areas respectively, in symmetric and parallel connection with respect to each other.

6. A programmable sequence controller as in claim 4, wherein said I/O data transfer means includes a decimal counter and an address counter, said decimal counter producing a writing pulse to said I/O data memory means and an adding pulse to said address counter when said I/O flag memory means indicates that none of the PCs connected to the common data bus is currently transferring I/O data to/from its associated controlled object, said address counter producing an address command signal to said I/O data memory means and to said I/O flag memory means upon detecting said adding pulse.

7. A sequence control system having a plurality of programmable sequence controllers, each of said controllers comprising:

I/O data control means adapted for coupling to input and output elements of a control object for transmitting/receiving I/O data;

I/O data memory means coupled to said I/O data control means for storing said I/O data;

program memory means for storing a sequence program defining a desired control of said control object;

calculating means for arithmetic calculation in accordance with said sequence program;

control means for applying control signals to said I/O data control means, I/O data memory means, program memory means and calculating means;

I/O flag memory means for storing an I/O flag in areas corresponding to an address of I/O data outputted in accordance with each sequence program in the other ones of said plurality of sequence controllers connected eans connected to said I/O data memory means and said I/O flag memory means for transferring said I/O data to any other of said plurality of sequence controllers, ranssaid I/O data transfer means being connected to one data bus line.

8. A sequence control system as in claim 7, wherein each of said program memory means is connected to a program loader through a program bus line.

* * * * *